United States Patent
Han et al.

(10) Patent No.: US 11,472,258 B2
(45) Date of Patent: Oct. 18, 2022

(54) VEHICLE CLIMATE CONTROL SYSTEM WITH CLOTHING LEVEL COMPENSATION

(71) Applicant: GM GLOBAL TECHNOLOGY OPERATIONS LLC, Detroit, MI (US)

(72) Inventors: Taeyoung Han, Bloomfield Hills, MI (US); Alok Warey, Novi, MI (US); Shailendra Kaushik, Novi, MI (US); Bahram Khalighi, Birmingham, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/145,532

(22) Filed: Jan. 11, 2021

(65) Prior Publication Data

US 2022/0219506 A1 Jul. 14, 2022

(51) Int. Cl.
*B60H 1/00* (2006.01)

(52) U.S. Cl.
CPC ....... *B60H 1/00742* (2013.01); *B60H 1/0073* (2019.05); *B60H 1/00735* (2013.01)

(58) Field of Classification Search
CPC .............. B60H 1/00742; B60H 1/0073; B60H 1/00735
See application file for complete search history.

(56) References Cited

U.S. PATENT DOCUMENTS

| | | | |
|---|---|---|---|
| 2003/0146290 A1* | 8/2003 | Wang ................. | B60H 1/00735 62/229 |
| 2010/0019050 A1* | 1/2010 | Han .................... | B60H 1/00642 236/44 C |
| 2015/0204556 A1* | 7/2015 | Kusukame ........... | G01J 5/0025 250/338.3 |
| 2017/0088098 A1* | 3/2017 | Frank ................. | B60H 1/00778 |
| 2017/0138627 A1 | 5/2017 | Han et al. | |
| 2019/0320503 A1* | 10/2019 | Han ..................... | H05B 1/0236 |
| 2021/0078382 A1* | 3/2021 | Maeng ............... | B60H 1/00814 |
| 2021/0291619 A1* | 9/2021 | Aghniaey .......... | B60H 1/00764 |
| 2022/0009307 A1* | 1/2022 | Neveu ............... | B60H 1/00964 |

FOREIGN PATENT DOCUMENTS

WO   WO-2021206887 A1 * 10/2021

\* cited by examiner

*Primary Examiner* — Nelson J Nieves (57) ABSTRACT

A climate control system includes a memory, a compensation module, and a climate control module. The memory is configured to store images captured by one or more image sensors. The compensation module is configured to: based on the images, estimate a clothing level of a first occupant in an interior cabin of a vehicle or receive the clothing level from at least one of an edge computing device or a cloud-based network device; determine a first EHT setpoint; and determine a first resultant EHT based on the clothing level and the first EHT setpoint. The climate control module is configured to: determine a first EHT error based on the first resultant EHT and a cabin temperature setpoint; determine a control value based on the first EHT error; and set climate control parameters to control a temperature of a first zone within the interior cabin based on the control value.

18 Claims, 7 Drawing Sheets

VEHICLE CLIMATE CONTROL SYSTEM WITH CLOTHING LEVEL COMPENSATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle climate control systems.

Automotive vehicles include heating, ventilation and air-conditioning (HVAC) systems for controlling temperatures within interior cabins of the vehicles. The HVAC systems provide thermal comfort to occupants of the vehicles by maintaining target temperatures, which may be set by the occupants. Different temperatures may be set for different zones of an interior cabin of a vehicle. The temperatures may be controlled based on signals from temperature sensors in the respective zones.

SUMMARY

A climate control system is provided and includes a memory, a compensation module, and a climate control module. The memory is configured to store images captured by one or more image sensors. The compensation module is configured to: based on the images, estimate a clothing level of a first occupant in an interior cabin of a vehicle or receive the clothing level from at least one of an edge computing device or a cloud-based network device; determine a first equivalent homogeneous temperature (EHT) setpoint; and determine a first resultant EHT based on the clothing level and the first EHT setpoint. The climate control module is configured to: determine a first EHT error based on the first resultant EHT and a cabin temperature setpoint; determine a control value based on the first EHT error; and set climate control parameters to control a temperature of a first zone within the interior cabin based on the control value.

In other features, the climate control system further includes the one or more image sensors.

In other features, the climate control system further includes a transceiver configured to transmit the images to the edge computing device and receive the clothing level from the edge computing device.

In other features, the climate control system further includes the edge computing device, wherein the edge computing device comprises a convolutional neural network configured to analyze the images and estimate the clothing level of the first occupant based on analysis results provided by the convolutional neural network.

In other features, the climate control system further includes a transceiver configured to transmit the images to the cloud based network device and receive the clothing level from the cloud based network device.

In other features, the compensation module is configured to: calculate an EHT compensation value based on a skin temperature and a baseline EHT temperature at a baseline clothing level; and determine the first resultant EHT based on the EHT compensation value.

In other features, the compensation module is configured to: based on the images, estimate a clothing level of a second occupant in the interior cabin of the vehicle or receive the clothing level of the second occupant from the at least one of the edge computing device or the cloud-based network device; determine a second EHT setpoint; and determine a second resultant EHT based on the clothing level of the second occupant and the second EHT setpoint. The climate control module is configured to: determine a second EHT error based on the second resultant EHT and a second cabin temperature setpoint for a second zone; determine another control value based on the second EHT error; and set climate control parameters to control a temperature of the second zone within the interior cabin based on the another control value.

In other features, the climate control system further includes a transceiver configured to transmit the images to the edge computing device and receive the clothing level of the second occupant from the edge computing device.

In other features, the climate control system further includes a transceiver configured to transmit the images to the cloud based network device and receive the clothing level of the second occupant from the cloud based network device.

In other features, the climate control module is configured to set the climate control parameters to adjust an opacity level of at least one of a sunroof or one or more windows.

In other features, a climate control method is provided and includes: capturing and storing images from one or more image sensors in a memory; based on the images, estimating a clothing level of a first occupant in an interior cabin of a vehicle or receive the clothing level from at least one of an edge computing device or a cloud-based network device; determining a first equivalent homogeneous temperature (EHT) setpoint; determining a first resultant EHT based on the clothing level and the first EHT setpoint; determining a first EHT error based on the first resultant EHT and a cabin temperature setpoint; determining a control value based on the first EHT error; and setting climate control parameters to control a temperature of a first zone within the interior cabin based on the control value.

In other features, the climate control method further includes transmitting the images to the edge computing device and receiving the clothing level from the edge computing device.

In other features, the climate control method further includes analyzing the images via a convolutional neural network and estimating the clothing level of the first occupant based on analysis results provided by the convolutional neural network.

In other features, the climate control method further includes transmitting the images to the cloud based network device and receiving the clothing level from the cloud based network device.

In other features, the climate control method further includes analyzing the images via a convolutional neural network and estimating the clothing level of the first occupant based on analysis results provided by the convolutional neural network.

In other features, the climate control method further includes: calculating an EHT compensation value based on a skin temperature and a baseline EHT temperature at a baseline clothing level; and determining the first resultant EHT based on the EHT compensation value.

In other features, the climate control method further includes: based on the images, estimating a clothing level of a second occupant in the interior cabin of the vehicle or receive the clothing level of the second occupant from the at least one of the edge computing device or the cloud-based network device; determining a second EHT setpoint; determining a second resultant EHT based on the clothing level of the second occupant and the second EHT setpoint; determining a second EHT error based on the second resultant EHT and a second cabin temperature setpoint for a second zone; determining another control value based on the second EHT error; and setting climate control parameters to control a temperature of the second zone within the interior cabin based on the another control value.

In other features, the climate control method further includes transmitting the images to the edge computing device and receiving the clothing level of the second occupant from the edge computing device.

In other features, the climate control method further includes transmitting the images to the cloud based network device and receiving the clothing level of the second occupant from the cloud based network device.

In other features, the climate control method further includes setting the climate control parameters to adjust an opacity level of at least one of a sunroof or one or more windows.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Various thermal sources can affect temperatures within an interior cabin of a vehicle and as a result comfort of occupants within the cabin. The thermal sources can include an engine, windows, one or more heaters, solar energy (referred to herein as solar load), external thermal energy of outside air, structural elements (e.g., panels and seats), occupants, and/or other thermal sources referred to below. The thermal energy level of the outside air depends on the air temperature (or outside ambient temperature). For example, a windshield and an instrument panel of a vehicle can experience high surface temperatures. In addition, the temperatures may be affected by different air speeds, vehicle speeds, and HVAC blower speeds. Temperatures of each element within the interior cabin can be related to and/or dependent on temperatures of other elements within the interior cabin and/or other environmental conditions. As a result, the temperature distributions and relationships within the interior cabin are complex and difficult to characterize and define. This makes calibration of a HVAC control system for occupant thermal comfort difficult.

The examples set forth herein include simplifying the calibration process while providing improved occupant thermal comfort. The examples eliminate subjective dependence and individual calibrator variation of traditional automatic climate control (ACC) calibration processes.

The examples include vehicle climate control systems that account for various occupant clothing levels based on captured images taken via image sensors (e.g., cameras and infrared sensors). A machine learning algorithm and a neural network are used to detect clothing levels of one or more occupants in one or more zones of a vehicle cabin. One or more equivalent homogenous temperature (EHT) values for the zones are then adjusted to account for the clothing levels. Various actuators are then controlled based on the adjusted EHT values to provide thermal comfort to the one or more occupants.

Figure 1:
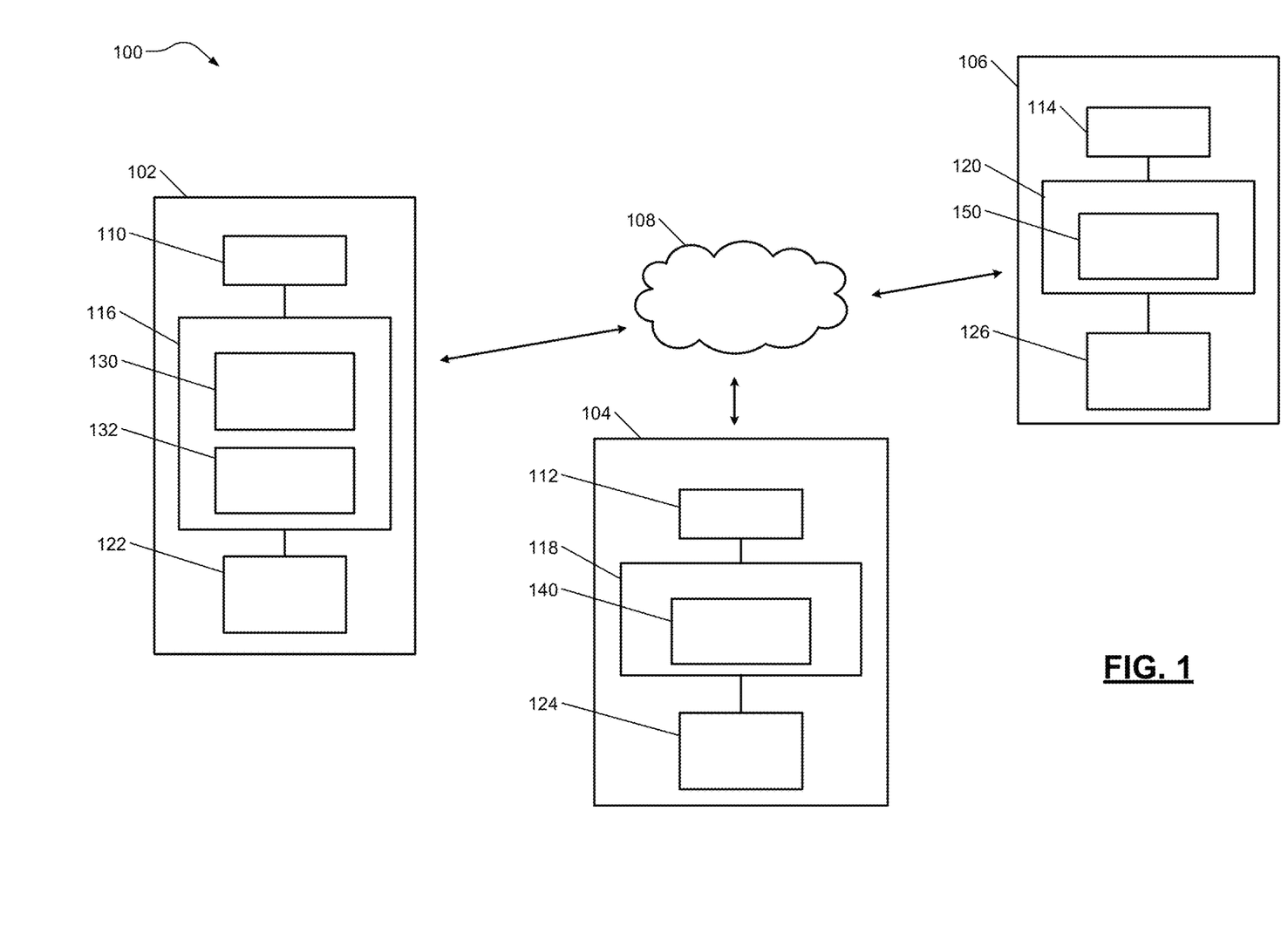
FIG. 1 is a functional block diagram of an example of an EHT-based climate control system implementing offboard clothing level detection of occupants within a vehicle in accordance with the present disclosure.

FIG. 1 shows an EHT-based climate control system 100 implementing offboard clothing level detection of occupants within a vehicle 102. The EHT-based climate control system 100 includes the vehicle 102 and may include an edge computing device 104 and/or a cloud-based network device 106, which may communicate with each other via a distributed network 108. The edge computing device 104 may be located within the vehicle 102 or be external to the vehicle, as shown. The edge computing device 104 may be an infrastructure device using vehicle-to-infrastructure (V2I) communication and located, for example, along a road on which the vehicle 102 is traveling. The infrastructure devices may include traffic signals, traffic signs, devices mounted on buildings and/or roadway structures, etc. The edge computing device 104 may be a micro-datacenter deployed at a cellular tower and/or regional station. The cloud-based network device may be remotely located at a central location and controlled, for example, by a service provider.

The vehicle 102, the edge computing device 104 and the cloud-based network device 106 may include respective transceivers 110, 112, 114, control modules 116, 118, 120, and memories 122, 124, 126. The vehicle control module 116 may include an EHT compensation module 130 and a climate control module 132. The control module 118 (or edge not control module) may include a clothing level module 140. The server control module 120 (or server control module) may include another clothing level module 150.

The clothing level modules 140, 150 receive interior cabin images captured within the vehicle 102 and based on the images estimate clothing levels of occupants within the vehicle 102. The clothing level modules 140, 150 may respectively include neural networks and implement machine learning algorithms to estimate the clothing levels. The neural networks may include convolutional neural networks. The machine learning algorithms may operate to better detect presence of clothing, levels of clothing, and recognize different types of clothing, such as pants, shirts, shorts, coats, hats, gloves, etc. In one embodiment, the edge node control module 118 performs real time data processing of the image data received from the vehicle 102 to perform basic analytics and forwards results of the analytics to the server control module 120 for further analysis. The neural networks detect feature lines and other attributes of objects shown in the images. The EHT compensation module 130 adjusts an EHT value based on the estimated clothing levels. The climate control module 132 controls temperature within the cabin based on the adjusted EHT value. These operations are further described below.

Figure 2:
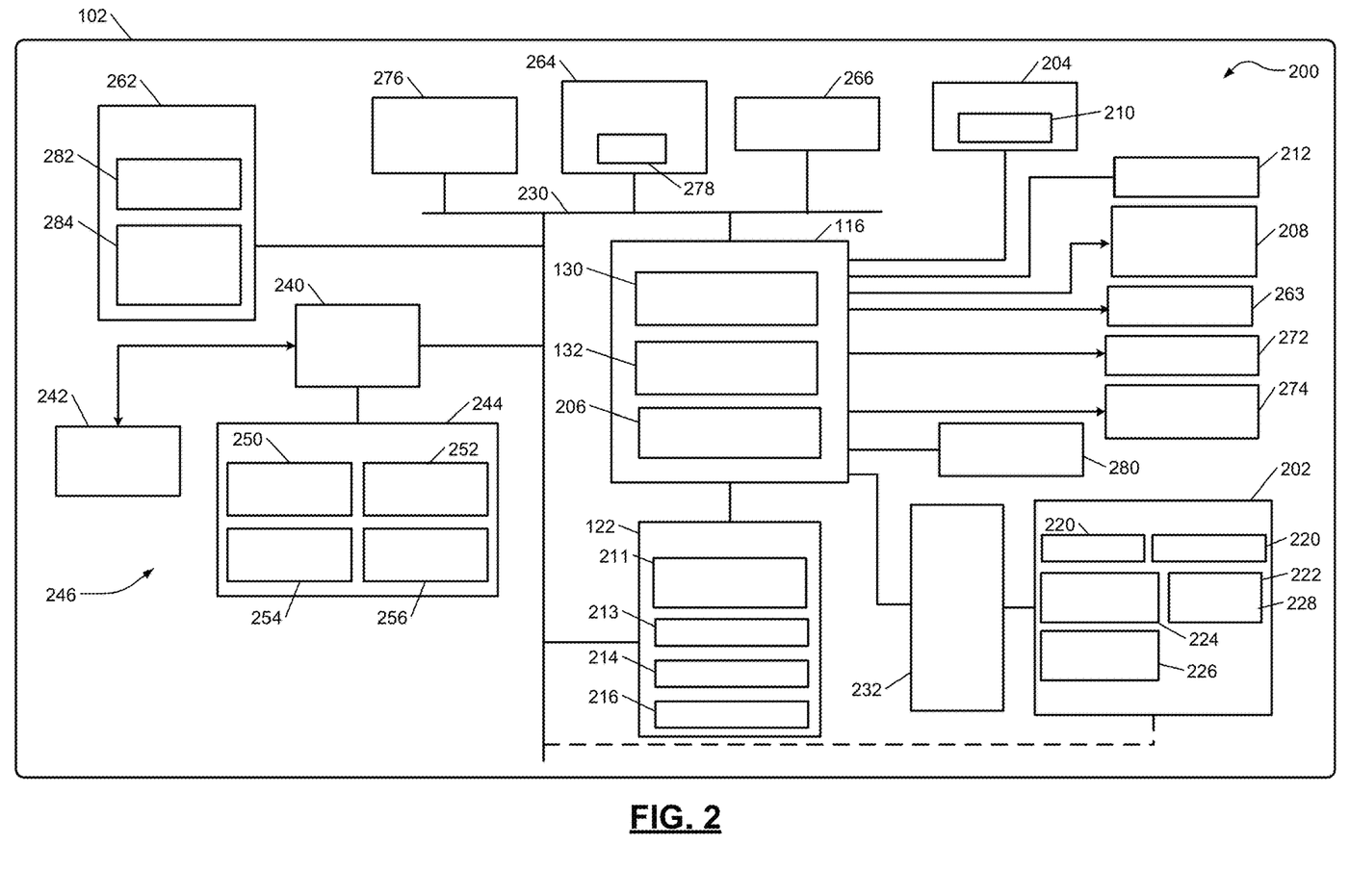
FIG. 2 is a functional block diagram of a portion of the EHT-based climate control system of FIG. 1.

FIG. 2 shows a portion 200 of the EHT-based climate control system 100 of FIG. 1 locate within the vehicle 102. The vehicle 102 may be a partially or fully autonomous vehicle or other type of vehicle. The portion 200 includes the vehicle control module 116, the memory 122, sensors 202, and the HVAC system 204. The vehicle control module 116 includes the modules 130, 132 and may include other modules 206. The climate control module 132 controls temperatures within a cabin of the vehicle 102 based on one or more compensated EHT values and one or more target (or set) temperatures for respective zones. Each zone may have a respective compensated EHT value and/or target temperature. Two or more zones may share a single compensated EHT value and/or a single target temperature. The target temperatures may be set based on inputs received from vehicle occupants via temperature input control devices 208. The temperature input control devices 208 may include knobs, buttons, slides, touchscreen icons, etc., which may be located on an instrument panel, a center console, an overhead console, and/or elsewhere. The target temperatures may be set via voice commands, using a microphone, a portable network device (e.g., a mobile phone, a tablet, a wearable device, etc.), and/or via some other input device.

The climate control module 132, in order to adjust temperatures within the cabin to match the target temperatures, may control the HVAC system 204 and other temperature adjusting elements, devices, and systems. This may include controlling air temperatures and velocities of air discharged into and/or circulated about the cabin. The climate control module 132 may control speeds of one or more blowers (or fans) 210. In one embodiment, the vehicle 102 includes smart glass 212. As an example, a sunroof of the vehicle 102 may include the smart glass 212. The climate control module 132 may control the opacity level of the smart glass 212 based on the compensated EHT values and the target temperatures.

The memory 122 may store EHT values 211 (e.g., EHT setpoints, EHT compensation values, EHT errors, etc.), other parameters 213, data 214, and algorithms 216 (e.g., EHT compensation algorithms, machine learning algorithms, etc.). The sensors 202 may be located throughout the vehicle 102 and include cameras 220, infrared (IR) sensors 222, an outside ambient temperature sensor 224, one or more interior cabin temperature sensors 226, and/or other sensors 228. An interior cabin temperature sensor may be included for each zone of the interior cabin of the vehicle 102. The other sensors 228 may include yaw rate sensors, accelerometers, global positioning system (GPS) sensors, air flow sensors, temperature sensors, pressure sensors, a vehicle speed sensor, motor speed sensors, etc. The vehicle control module 116 and the sensors 202 may be in direct communication with each other, may communicate with each via a controller area network (CAN) bus 230, and/or via an Ethernet switch 232. In the example shown, the sensors 202 are connected to the vehicle control module 116 via the Ethernet switch 232, but may also or alternatively be connected directly to the vehicle control module 116 and/or the CAN bus 230.

The vehicle 102 may further include other control modules, such as a chassis control module 240 that controls torque sources including one or more electric motors 242 and one or more engines (one engine 244 is shown). The chassis control module 240 may control distribution of output torque to axles of the vehicle 102 via the torque sources. The chassis control module 240 may control operation of a propulsion system 246 that includes the electric motor(s) 242 and the engine(s) 244. Each of the engines may include a starter motor 250, a fuel system 252, an ignition system 254 and a throttle system 256.

In one implementation, the vehicle control module 116 is a body control module (BCM) that is in communication with and/or controls operation of a telematics module 262, a brake system 263, a navigation system 264, an infotainment system 266, other actuators 272 and devices 274, and other vehicle systems and modules 276. The navigation system 264 may include a GPS 278. The other actuators 272 may include steering actuators and/or other actuators. The modules and systems 116, 204, 240, 262, 264, 266 may communicate with each other via the CAN bus 230. A power source 280 may be included and power the vehicle control module 116 and other systems, modules, controllers, memories, devices and/or components. The power source 280 may include one or more batteries and/or other power sources. The control module 116 may perform countermeasures and/or autonomous vehicle operations based on planned trajectory of the vehicle 102, detected objects, locations of the detected objects, and/or other related operations and/or parameters. This may include controlling the stated torque sources and actuators as well as providing images, indications, and/or instructions via the infotainment system 266.

The telematics module 262 may include transceivers 282 and a telematics control module 284, which may be used for communicating with other vehicles, networks, edge computing devices, and/or cloud-based devices. The transceivers 282 may include the transceiver 110 of FIG. 1. The control module 116 may control the modules and systems 204, 262, 263, 264, 266 and other actuators, devices and systems (e.g., smart glass 212, the actuators 272 and the devices 274). This control may be based on data from the sensors 202.

Figure 3:
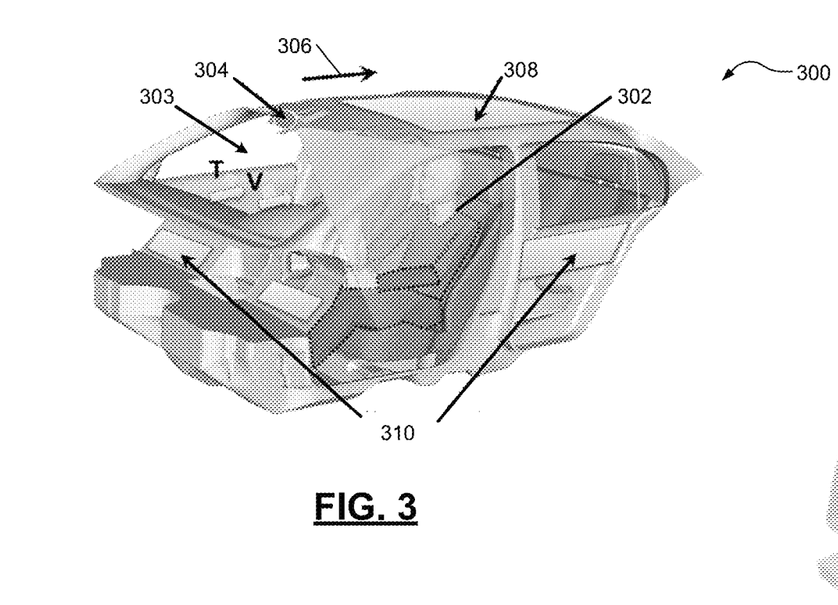
FIG. 3 is a perspective view of a portion of a vehicle illustrating image capturing of a vehicle occupant for clothing level estimation.

FIG. 3 shows a portion 300 of a vehicle (e.g., the vehicle 102 of FIGS. 1-2) illustrating image capturing of a vehicle occupant 302 for clothing level estimation. In the example show, a single image sensor 304 is used to capture images of the vehicle occupant 302 within an interior cabin 303 of the vehicle. The image sensor 304 may be a camera or an IR sensor. The images captured by the image sensor 304 may then be analyzed as described herein to estimate a clothing level of the occupant 302. Although a single image sensor is shown, any number of image sensors may be included to capture images of the occupant 302 and/or other occupants in the vehicle. Arrow 306 represents vehicle speed, which may be monitored when detecting parameters that can affect interior cabin temperature.

Numerical designator 308 identifies smart glass of the vehicle. In the example shown, the vehicle includes a sunroof that includes smart glass, which may be controlled by the vehicle control module 116 of FIGS. 1-2 based on the clothing level of the occupant 302. The vehicle may include radiant heaters and/or elements 310, which may be controlled by the vehicle control module 116 to adjust temperatures within the interior cabin. The vehicle control module 116 may further control the HVAC system 204 and the blowers 210 of FIG. 2 to adjust air flow temperature $T_{air}$ and velocity $V_{air}$ of air discharged into and/or circulated within the interior cabin 303 of FIG. 3.

Figure 4:
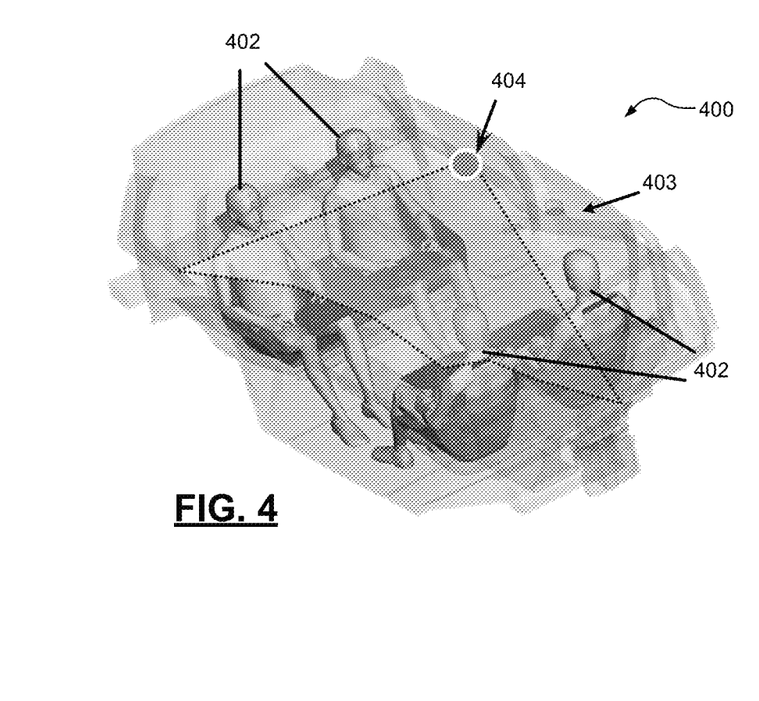
FIG. 4 is a perspective view of a portion of a vehicle illustrating image capturing of multiple occupants for clothing level estimation.

FIG. 4 shows a portion 400 of a vehicle (e.g., the vehicle 102 of FIGS. 1-2) illustrating image capturing of multiple occupants 402 for clothing level estimation. In the example show, a single image sensor 404 is used to capture images of the vehicle occupants 402 within an interior cabin 403 of the vehicle. The image sensor 404 may be a camera or an IR sensor. The images captured by the image sensor 404 may then be analyzed as described herein to estimate clothing levels of the occupants 402. Although a single image sensor is shown, any number of image sensors may be included to capture images of the occupants 402.

Figure 5:
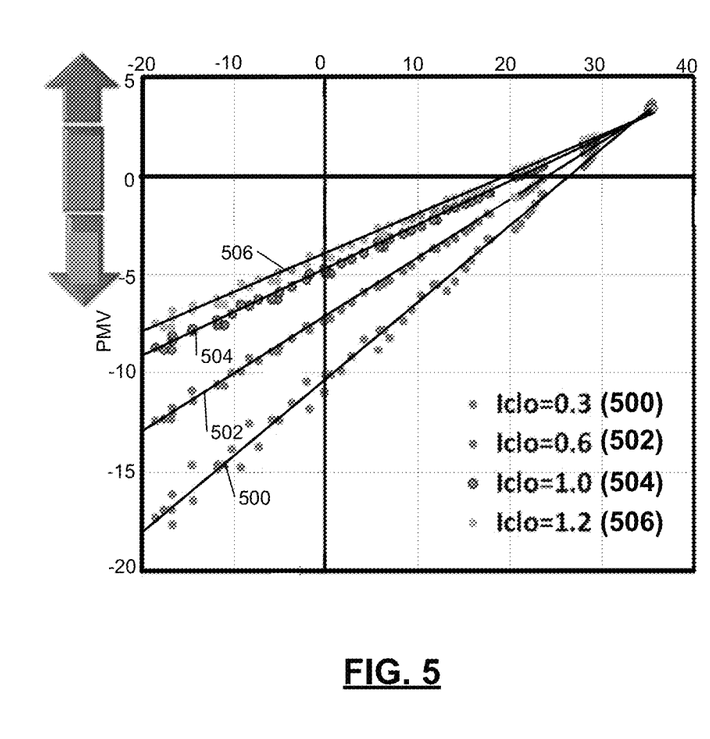
FIG. 5 is an example graph including predicted mean vote (PMV) index versus EHT plots for different clothing levels without clothing level based compensation.

FIG. 5 shows a graph including predicted mean vote (PMV) index versus EHT plots for different clothing levels without clothing level based compensation. In the example shown, sets of points are plotted for four different clothing levels (lclo=0.3, lclo=0.6, lclo=1.0, and lclo=1.2). Linear curves 500, 502, 504, 506, which have been curve fitted to the sets of points, are provided respectively for the four different clothing levels. A clothing level of lclo=0 refers to an occupant not wearing any cloths. A clothing level of lclo=0.6 refers to an occupant wearing light clothing (e.g., summer warm weather attire, such as shorts and a t-shirt). A clothing level of lclo=1.2 refers to an occupant wearing heavy clothing (e.g., winter cold weather attire, such as pants, a winter coat, a hat and gloves). The PMV is an empirical fit to the human sensation of thermal comfort. A PMV of 5 is considered hot. A PMV of 0 is considered neutral. A PMV of −5 is considered cold. The units-of measure of EHT are ° C. (degrees Celsius). As can be seen by the plots, the higher the clothing level, the less an occupant feels temperature variation or experiences a temperature change sensation.

Figure 6:
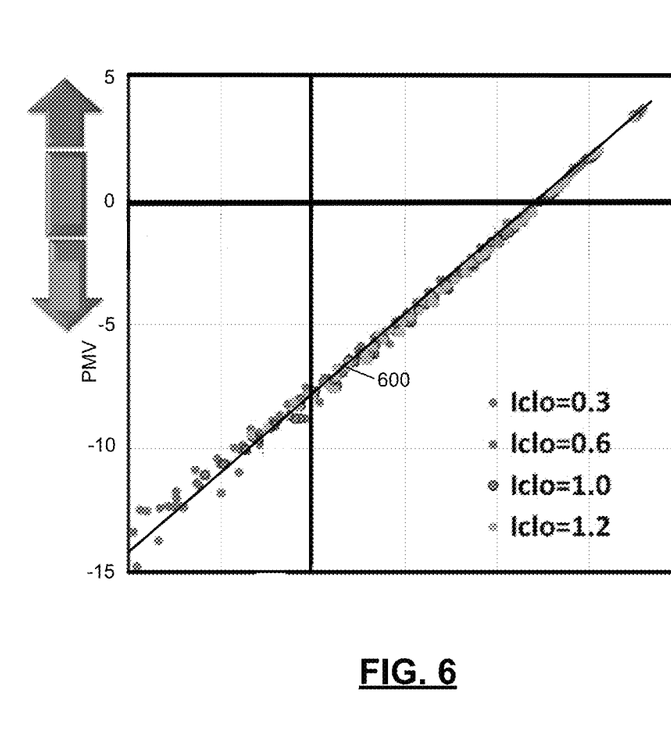
FIG. 6 is an example graph including PMV index versus EHT plots for different clothing levels with clothing level based compensation in accordance with the present disclosure.

FIG. 6 shows a graph including PMV index versus EHT plots for different clothing levels with clothing level based compensation as disclosed herein. In the example shown, sets of points are plotted for four different clothing levels (lclo=0.3, lclo=0.6, lclo=1.0, and lclo=1.2). As can be seen, the sets of points, in general, can be curve fitted to a same linear curve 600. As a result, the temperature compensation disclosed herein accounts for the different clothing levels and minimizes temperature variations and/or sensations experienced by a vehicle occupant.

Figure 7:
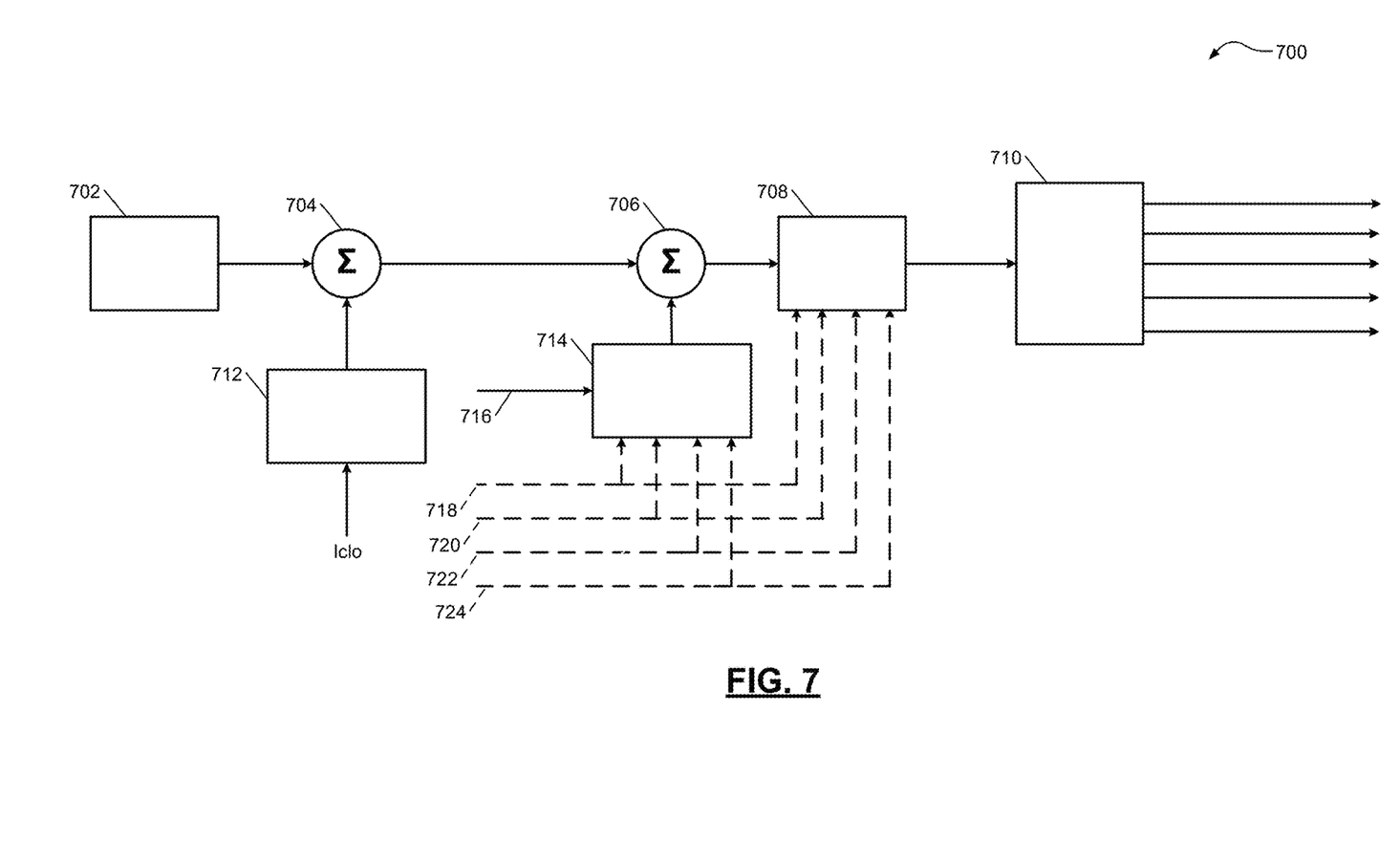
FIG. 7 illustrates an example EHT-based climate control system with clothing level compensation in accordance with the present disclosure.

FIG. 7 shows an example EHT-based climate control system 700 with clothing level compensation. The EHT-based climate control system 700 may be implemented by the vehicle control module 116 of FIGS. 1-2. The EHT-based climate control system 700 may set an EHT setpoint EHTsp, as represented by box 702. The EHT setpoint EHTsp may be determined using traditional methods. A lookup table may be used to determine the EHT setpoint EHTsp based on application and various parameters. The application may refer to the type of vehicle and features of the vehicle, such as cabin size, materials in the cabin, number and sizes of windows, opacity levels of windows, types of heaters and heating elements, number of seats, materials within the cabin, number of occupants, etc. The EHT setpoint EHTsp may be a fixed value or may be adjusted based on these and other factors.

The EHT setpoint EHTsp, for example, may be set at 24° C., which may correspond to a comfort rating of 5 on a comfort scale of 1-9. On an exemplary comfort scale, 1 may be classified as cold, 2 may be classified as very cool, 3 may be classified as cool, 4 may be classified as slightly cool, 5 may be classified as comfortable, 6 may be classified as slightly warm, 7 may be classified as warm, 8 may be classified as too warm, and 9 may be classified as hot. An occupant may be "comfortable" at an EHT setpoint EHTsp in the range of 20-25 degrees Celsius depending on the person, season and clothing level.

The EHT setpoint EHTsp may be provided to a first summer 704, which sums EHTsp with an EHT compensation value $\Delta T_{lclo-EHT}$. The EHT compensation value $\Delta T_{lclo-EHT}$ may be calculated based on an estimated clothing level lclo, as represented by box 712. The clothing level lclo may be estimated by the vehicle control module 116, another module of the vehicle, or externally at an edge-computing device (e.g., the edge-computing device 104 of FIG. 1) or a cloud-based network device (e.g., the cloud-based network device 106 of FIG. 1).

The first summer provides a resultant EHT value EHTres, which may be provided to a second summer 706. The resultant EHT value EHTres is independent of an outside ambient temperature Ta, a solar load level, a HVAC air velocity of air discharged into or circulated within an interior cabin of the vehicle and interior cabin temperatures. The EHT for neutral thermal sensation depends on the occupant metabolic rate and clothing level. The calculation for the resultant EHT value EHTres accounts for the clothing level. The EHT resultant values referred to herein are used to provide representative values to characterize a non-uniform thermal environment as a uniform thermal environment that relates to occupant thermal sensation.

The second summer may subtract a temperature setpoint Tsp from the resultant EHT value EHTres to provide an EHT error value ΔEHT. The temperature setpoint Tsp may be determined based on a control signal CONT (716), the outside ambient temperature Ta (718), the solar load level (720), the HVAC air velocity (722) of air discharged into or circulated within an interior cabin of the vehicle, interior cabin temperatures 724 (e.g., interior cabin temperature Tc and/or other interior cabin temperatures), and/or other parameters. The temperature setpoint Tsp may be set based on a radiant mean temperature in the interior cabin of the vehicle. The temperature setpoint Tsp may be based on steady-state values of these parameters and/or transient (or changes) in these parameters. This operation is represented by box 714. The control signal 716 may be generated, for example, based on a vehicle occupant input indicating a set temperature requested by the vehicle occupant. This may be provided for example by one of the temperature input control devices 208 of FIG. 2.

Box 708 represents determination of a control value Yn based on the EHT error value ΔEHT and one or more of the signals 718, 720, 722, 724. The control value Yn may be based on steady-state values of these parameters and/or transient (or changes) in these parameters. A proportional integral derivative (PID) controller may be used to generate the control value Yn using feedback control.

Box 710 represents determination of climate control parameters based on the control value Yn, where the climate control parameters include opacity of windows (or smart glass), blower speeds, discharge or circulation air temperature Tair, a HVAC mode, radiant heating settings of radiant heaters and/or heating elements, etc. HVAC modes may include a heating mode, a cooling mode, an air circulating mode, an air discharge mode, or a combination thereof.

Figure 8A:
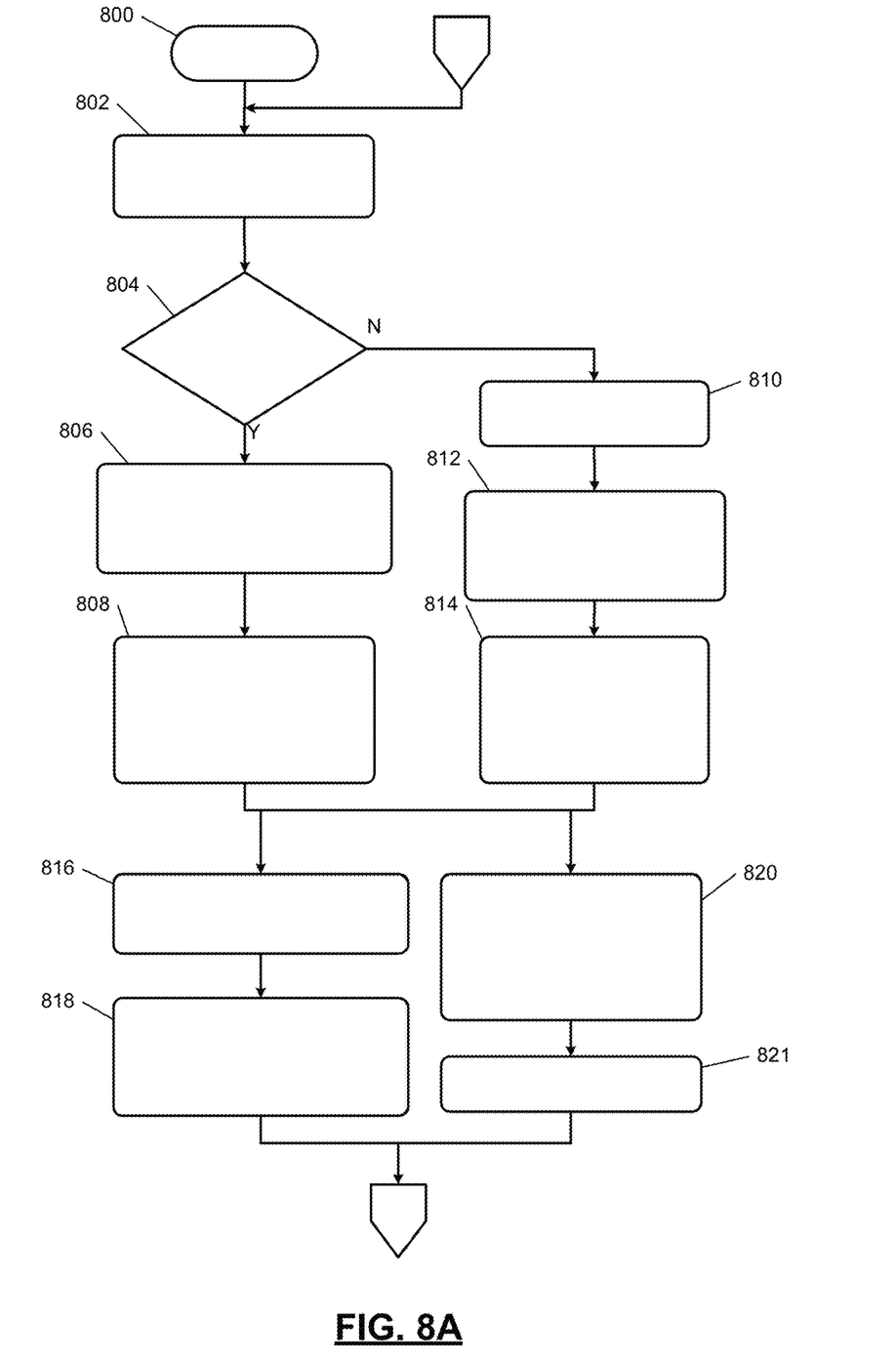
FIGS. 8A-8B illustrates an example EHT-based climate control method implemented by a vehicle in accordance with the present disclosure.
Figure 8B:
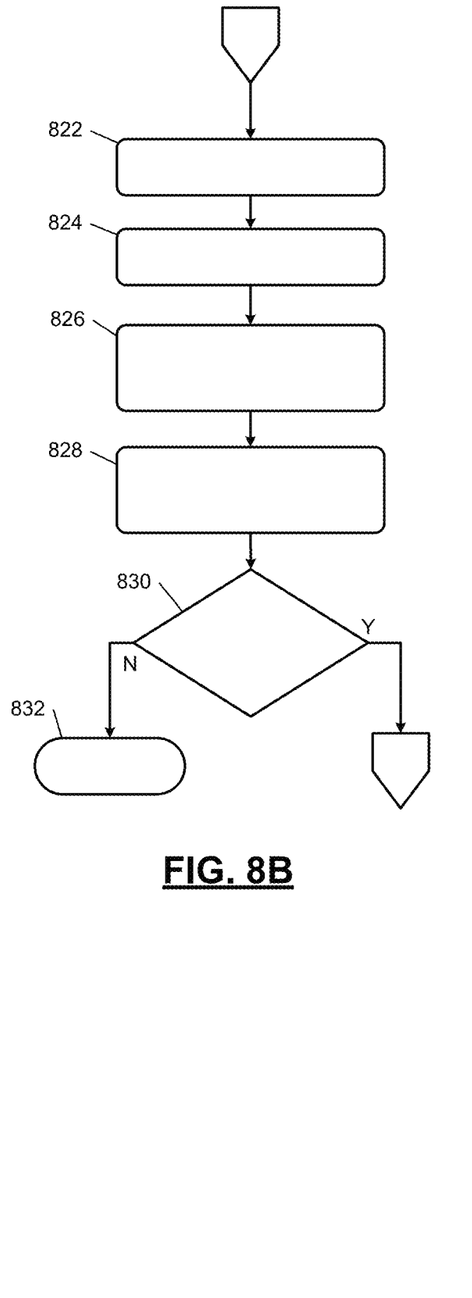
Figure 9:
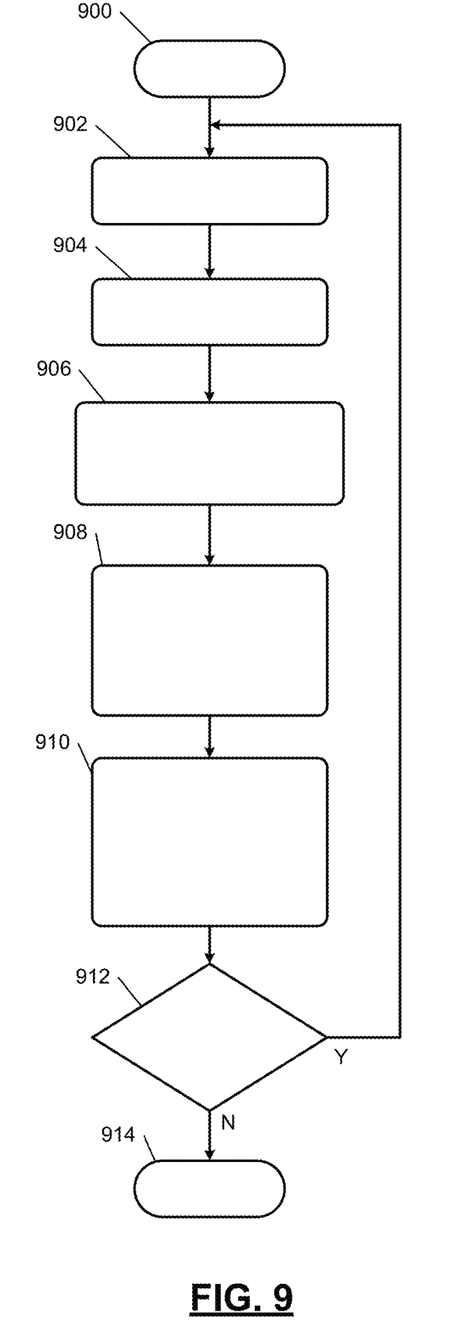
FIG. 9 illustrates an example clothing level estimation method implemented by an edge computing and/or cloud-based network device in accordance with the present disclosure.

The following methods of FIGS. 8A-9 may be concurrently performed. The methods may be performed to FIGS. 8A-8B shows an EHT-based climate control method implemented by the vehicle 102 of FIGS. 1-2. The operations of this method may be iteratively performed. The method may begin at 800. At 802, the sensors 202 capture images of one or more zones of an interior of the vehicle 102.

At 804, the EHT compensation module 130 may determine whether to send the captured image to an external processing device (e.g., one of the devices 104, 106 of FIG. 1). If yes, operation 806 is performed, otherwise operation 810 is performed.

At 806, the EHT compensation module 130 transmits the images to the external processing device.

At 808, the EHT compensation module 130 receives one or more clothing levels of one or more occupants in the one or more zones from the external processing device. A signal may be received from the external processing device identifying the occupants, locations of the occupants, and the clothing levels of the occupants.

At 810, the EHT compensation module 130 may analyze the captured images to detect occupants, locations of the occupants and clothing levels of the occupants. At 812, the EHT compensation module 130 detects the occupants and locations of the occupants. This may include object, size, and shape image recognition based on historical data. The EHT compensation module 130 may perform image processing using a neural network to recognize shapes, colors, object detection, skin recognition, clothing patterns, etc. Presence of occupants may also be detected via non-image based signals. For example, weight and/or strain sensors in seats of the vehicle may indicate occupants on the seats of the vehicle.

At 814, the EHT compensation module 130 may determine the clothing levels of the occupants. This may include using a neural network and/or machine learning system to perform object, size, and shape image recognition based on historical data. The EHT compensation module 130 may perform image processing using a neural network to recognize shapes, colors, object detection, skin recognition, clothing patterns, etc. Pixels of the images may be analyzed for various known patterns to identify the stated recognized features and/or other features such as types of clothing.

At 816, the EHT compensation module 130 calculates an EHT compensation value $\Delta T_{Iclo-EHT}$ based on the clothing levels. As an example, the EHT compensation value $\Delta T_{Iclo-EHT}$ may be determined using equations 1-2, where $Iclo_0$ is the baseline clothing level (e.g., 0.6), Iclo is the determined clothing level, $T_{skin}$ is skin temperature of a human (e.g., 34° C.), and $T_{EHT0}$ is a reference EHT for the baseline clothing level $Iclo_0$. The baseline clothing level $Iclo_0$ and the skin temperature $T_{skin}$ may be fixed values. Equation 2 may be used to first determine $T_{EHT0}$ and then equation 1 may be used to determine the EHT compensation value $\Delta T_{Iclo-EHT}$. The EHT compensation value $\Delta T_{Iclo-EHT}$ may be positive or negative.

$$\Delta T_{Iclo-EHT} = \left( \frac{1 + 1.395 * Iclo_0}{1 + 1.395 * Iclo} - 1 \right)(T_{skin} - T_{EHT0}) \quad (1)$$

$$T_{EHT0} = \text{Baseline} T_{EHT0} \text{ at } Iclo_0 \quad (2)$$

Although equation 1 includes a ratio having a constant scaling value 1.395 in both the numerator and the denominator, other constant values may be used.

At 818, the EHT compensation module 130 determines the resultant EHT value EHTres based on the EHT setpoint EHTsp and the EHT compensation value $\Delta T_{Iclo-EHT}$. The resultant EHT value EHTres may be a sum of the EHT setpoint EHTsp and the EHT compensation value $\Delta T_{Iclo-EHT}$ as described above. At 820, the climate control module 132 determines the external ambient air temperature, the cabin temperature, the solar load, and the HVAC air discharge velocity. At 821, the climate control module 132 determines the cabin temperature setpoint Tsp. This may be done as described above with respect to box 714 of FIG. 7. Operation 822 may be performed subsequent to operations 818, 821.

At 822, the climate control module 132 may determine the EHT error value $\Delta EHT$ based on the resultant EHT value EHTres and the setpoint temperature Tsp. This may be accomplished via the summer 706 of FIG. 7. At 824, the climate control module 132 may determine the control value Yn based on the EHT error value $\Delta EHT$. This may be done using one or more tables and/or one or more equations relating the EHT error value to the value Yn. At 826, the climate control module 132 determines climate control parameters based on the control value Yn. This may be done using one or more tables and/or one or more equations relating the value Yn to the climate control parameters. At 828, the climate control module 132 control the HVAC system 204 based on the climate control parameters.

At 830, the climate control module 132 determines whether there is another zone for which to perform the above-described operations and/or another iteration of the above-described operation should be performed for the same one or more zones. If yes, then operation 802 may be performed, otherwise the method may end at 832.

FIG. 9 shows a clothing level estimation method implemented by an edge computing and/or cloud-based network device (e.g., devices 104, 106 of FIG. 1). The operations of this method may be iteratively performed and may be performed by one of the control modules 118, 120 and/or one of the clothing level modules 140, 150 of FIG. 1. The method may begin at 900. At 902, the control module receives captured images from the vehicle 102.

At 904, the control module may analyze the captured images to detect occupants, locations of the occupants and clothing levels of the occupants. At 906, the control module detect the occupants and locations of the occupants. This may include object, size, and shape image recognition based on historical data. The control module may perform image processing using a neural network to recognize shapes, colors, object detection, skin recognition, clothing patterns, etc. At 908, the control module may determine the clothing levels of the occupants. This may include using a neural network and/or machine learning system to perform object, size, and shape image recognition based on historical data. The control module may perform image processing using a neural network to recognize shapes, colors, object detection, skin recognition, clothing patterns, etc. Pixels of the images may be analyzed for various known patterns to identify the stated recognized features and/or other features such as types of clothing.

At 910, the control module transmits a signal to the vehicle 102 indicating the one or more determined clothing levels. The signal may also indicate the detection and locations of one or more corresponding occupants. At 912, the control module may determine whether to perform the above method for another zone of the interior cabin of the vehicle 102. If yes, operation 902 may be performed, otherwise the method may end at 914.

The above-described examples include a climate control system that personalizes thermal comfort based on clothing levels of individuals. The clothing levels may be determined using a convolutional neural network. The examples provide thermal comfort by controlling temperatures within an interior cabin of a vehicle while minimizing human subjectivities in temperature calibration. Actuators may be controlled based on automatically determined control parameters without and/or independent of occupant intervention. The thermal comfort is provided also while minimizing energy consumption of a HVAC system. Localized temperatures are determined for respective zones within a vehicle for different occupants within the zones to provide tuned thermal comfort for each occupant.

The described systems translate a non-uniform environment to a uniform environment representation using EHT values. The EHT-based climate control systems described herein provide real-time control of smart glass, radiant heating, discharge air temperature, blower speed, and HVAC modes to a neutral thermal sensation (not too hot and not too cold) for vehicle occupants. The systems provide fine tuning of control set temperatures based on clothing levels of occupants.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A climate control system comprising:
   a memory configured to store images captured by one or more image sensors;
   a compensation module configured to
      based on, estimate a clothing level of a first occupant in an interior cabin of a vehicle or receive the clothing level from at least one of an edge computing device or a cloud-based network device,
      determine a first equivalent homogeneous temperature (EHT) setpoint,
      determine a first resultant EHT based on the clothing level and the first EHT setpoint;
      calculate an EHT compensation value based on a skin temperature and a baseline EHT temperature at a baseline clothing level, and
      determine the first resultant EHT based on the EHT compensation value; and
   a climate control module configured to
      determine a first EHT error based on the first resultant EHT and a cabin temperature setpoint,
      determine a control value based on the first EHT error, and
      set climate control parameters to control a temperature of a first zone within the interior cabin based on the control value.

2. The climate control system of claim 1, further comprising the one or more image sensors.

3. The climate control system of claim 1, further comprising a transceiver configured to transmit the images to the edge computing device and receive the clothing level from the edge computing device.

4. The climate control system of claim 3, further comprising the edge computing device, wherein the edge computing device comprises a convolutional neural network configured to analyze the images and estimate the clothing level of the first occupant based on analysis results provided by the convolutional neural network.

5. The climate control system of claim 1, further comprising a transceiver configured to transmit the images to the cloud-based network device and receive the clothing level from the cloud-based network device.

6. The climate control system of claim 1, wherein:
   the compensation module is configured to
      based on the images, estimate a clothing level of a second occupant in the interior cabin of the vehicle or receive the clothing level of the second occupant from the at least one of the edge computing device or the cloud-based network device,
      determine a second EHT setpoint, and
      determine a second resultant EHT based on the clothing level of the second occupant and the second EHT setpoint; and
   the climate control module is configured to
      determine a second EHT error based on the second resultant EHT and a second cabin temperature setpoint for a second zone,
      determine another control value based on the second EHT error, and
      set the climate control parameters to control a temperature of the second zone within the interior cabin based on the another control value.

7. The climate control system of claim 6, further comprising a transceiver configured to transmit the images to the edge computing device and receive the clothing level of the second occupant from the edge computing device.

8. The climate control system of claim 6, further comprising a transceiver configured to transmit the images to the cloud-based network device and receive the clothing level of the second occupant from the cloud-based network device.

9. The climate control system of claim 1, wherein the climate control module is configured to set the climate control parameters to adjust an opacity level of at least one of a sunroof or one or more windows.

10. A climate control method comprising:
   capturing and storing images from one or more image sensors in a memory;
   based on the images, estimating a clothing level of a first occupant in an interior cabin of a vehicle or receive the clothing level from at least one of an edge computing device or a cloud-based network device;
   determining a first equivalent homogeneous temperature (EHT) setpoint;
   determining a first resultant EHT based on the clothing level and the first EHT setpoint;
   determining a first EHT error based on the first resultant ENT and a cabin temperature setpoint;
   determining a control value based on the first EHT error;
   setting climate control parameters to control a temperature of a first zone within the interior cabin based on the control value;
   based on the images, estimating a clothing level of a second occupant in the interior cabin of the vehicle or receive the clothing level of the second occupant from the at least one of the edge computing device or the cloud-based network device;
   determining a second EHT setpoint;
   determining a second resultant ENT based on the clothing level of the second occupant and the second ENT setpoint;
   determining a second EHT error based on the second resultant ENT and a second cabin temperature setpoint for a second zone;
   determining another control value based on the second ENT error; and setting the climate control parameters to control a temperature of the second zone within the interior cabin based on the another control value.

11. The climate control method of claim 10, further comprising transmitting the images to the edge computing device and receiving the clothing level from the edge computing device.

12. The climate control method of claim 11, further comprising analyzing the images via a convolutional neural network and estimating the clothing level of the first occupant based on analysis results provided by the convolutional neural network.

13. The climate control method of claim 10, further comprising transmitting the images to the cloud-based network device and receiving the clothing level from the cloud-based network device.

14. The climate control method of claim 13, further comprising analyzing the images via a convolutional neural network and estimating the clothing level of the first occupant based on analysis results provided by the convolutional neural network.

15. The climate control method of claim 10, further comprising:
calculating an EHT compensation value based on a skin temperature and a baseline EHT temperature at a baseline clothing level; and
determining the first resultant EHT based on the EHT compensation value.

16. The climate control method of claim 10, further comprising transmitting the images to the edge computing device and receiving the clothing level of the second occupant from the edge computing device.

17. The climate control method of claim 10, further comprising transmitting the images to the cloud-based network device and receiving the clothing level of the second occupant from the cloud-based network device.

18. The climate control method of claim 10, further comprising setting the climate control parameters to adjust an opacity level of at least one of a sunroof or one or more windows.

* * * * *